United States Patent
Deng et al.

(10) Patent No.: US 6,169,679 B1
(45) Date of Patent: Jan. 2, 2001

(54) METHOD AND SYSTEM FOR SYNCHRONIZING THE PHASE ANGLES OF PARALLEL CONNECTED INVERTERS

(75) Inventors: Doug D. Deng; Kon-King Mike Wang, both of Canton, MI (US)

(73) Assignee: Ford Motor Company, Dearborn, MI (US)

( * ) Notice: Under 35 U.S.C. 154(b), the term of this patent shall be extended for 0 days.

(21) Appl. No.: 09/532,796

(22) Filed: Mar. 21, 2000

(51) Int. Cl.$^7$ .................................................. H02M 7/00
(52) U.S. Cl. ............................................................ 363/72
(58) Field of Search ........................... 363/71, 720, 65

(56) References Cited

U.S. PATENT DOCUMENTS

| | | |
|---|---|---|
| 3,675,037 | 7/1972 | Hamilton . |
| 4,328,429 | 5/1982 | Kublick . |
| 4,565,953 | 1/1986 | Espelage et al. . |
| 5,001,620 * | 3/1991 | Smith ..................................... 363/72 |
| 5,016,158 * | 5/1991 | Matsui et al. ........................... 363/72 |
| 5,225,973 | 7/1993 | Patel et al. . |
| 5,257,180 | 10/1993 | Sashida et al. . |

* cited by examiner

*Primary Examiner*—Shawn Riley
(74) *Attorney, Agent, or Firm*—Mark S. Sparschu; Roger L. May

(57) ABSTRACT

A method for transmitting phase angle information between inverters in a parallel connected inverter system to synchronize the phase angles of the inverters includes transmitting a common phase angle signal to server inverters. The common phase angle signal is a function of the phase angle of a master inverter. The common phase angle signal is indicative of the absolute phase angle of the master inverter when the phase angle of the master inverter is equal to a phase angle value associated with a new phase cycle. The common phase angle signal is indicative of an incremental phase angle change of the phase angle of the master inverter in a given time period while the phase angle of the master inverter is different from the value associated with a new phase cycle. The server inverters control their phase angles in accordance with the common phase angle signal such that the phase angles of the master inverter and the server inverters are synchronized.

12 Claims, 2 Drawing Sheets

METHOD AND SYSTEM FOR SYNCHRONIZING THE PHASE ANGLES OF PARALLEL CONNECTED INVERTERS

TECHNICAL FIELD

The present invention generally relates to methods and system for synchronizing the phase angles of parallel connected inverters and, more particularly, to a method and system for transmitting phase angle information between inverters in a parallel connected inverter system to synchronize the phase angles of the inverters.

BACKGROUND ART

An inverter is a device which converts direct current (DC) electricity to alternating current (AC) electricity. Inverters are often used to power AC devices in automobiles. In practice, multiple AC voltage sources are needed to be connected in parallel to meet the higher power output requirements of vehicle devices or loads.

FIG. 1 illustrates an electric system 10 having a plurality of inverters 12a, 12b, and 12n and a load 14. Inverters 12 are connected in parallel between one end 18 of load 14 and ground 16. The other end 20 of load 18 is connected to ground 16. Each of inverters 12a, 12b, and 12n includes a respective AC voltage source 22a, 22b, and 22n connected to a respective inductance source 24a, 24b, and 24n. Each AC voltage source 22 provides an output voltage vector $v_i$ and an output inductance $L_i$, where i=a, b, ..., n. The voltage vector $v_i$ has an associated voltage magnitude and phase angle. The phase angle varies from 0° to 360°. AC voltage sources 22 are configured from electronic voltage source inverters (VSIs).

The phase angle difference among parallel voltage sources can cause circulating real power among these voltage sources. The circulating real power reduces the power capability and efficiency of these voltage sources. The circulating real power may also cause malfunction of the inverters. To eliminate and minimize the circulating real power it is necessary to eliminate and minimize the phase angle difference between the inverters.

FIG. 2 illustrates a parallel system 30 having two inverters 32a and 32b. Each inverter 32 has a respective AC voltage source 34a and 34b and an inductance source 36a and 36b. AC voltage sources 34a and 34b provide respective output voltage vectors $v_1$, and $v_2$. FIG. 3 illustrates the phase angle difference δ between the two voltage vectors $v_1$ and $v_2$. To reduce the circulating real power it is desired to reduce the phase angle difference δ to the smallest value possible.

The circulating real power between output voltage vectors $v_1$ and $v_2$ is determined by:

circulating real power $=V_1*V_2*\sin(\delta)/(2\pi f)/(L_1+L_2)$ where f is the fundamental operation frequency of inverters 32, $V_1$ and $V_2$ are the root-mean-square (rms) value of the AC output voltage of $v_1$ and $v_2$, respectively.

There is no circulating real power if the phase angles are the same, i.e., δ=zero. Therefore, it is desired to eliminate and minimize the phase angle differences between inverters in a parallel connected voltage source inverter system.

DISCLOSURE OF INVENTION

Accordingly, it is an object of the present invention to provide a method and system for transmitting phase angle information between inverters in a parallel connected inverter system to synchronize the phase angles of the inverters.

In accordance with the object and other objects, the present invention provides a method for transmitting phase angle information between inverters in a parallel connected inverter system to synchronize the phase angles of the inverters. The inverter system has a master inverter and a plurality of server inverters connected in parallel. Each inverter has a voltage source. Each of the voltage sources generate a voltage having an associated phase angle which varies as a function of time in a phase cycle.

The method includes transmitting a common phase angle signal to each of the server inverters. The common phase angle signal is a function of the phase angle of the master inverter. The common phase angle signal is indicative of the absolute phase angle of the master inverter when the phase angle of the master inverter is equal to a phase angle value associated with a new phase cycle. The common phase angle signal is indicative of an incremental phase angle change of the phase angle of the master inverter in a given time period while the phase angle of the master inverter is different from the value associated with a new phase cycle.

The method preferably further includes controlling the phase angle of each of the server inverters in accordance with the common phase angle signal such that the phase angles of the master inverter and the server inverters are synchronized. The phase angle of each of the server inverters is adjusted to be equal to the absolute phase angle of the master inverter when the common phase angle signal is indicative of the absolute phase angle of the master inverter. The phase angle of each of the server inverters is adjusted to be equal to the summed value of 1) the incremental phase angle change of the phase angle of the master inverter in the given time period and 2) the phase angle of the respective server inverter prior to the given time period when the common phase angle signal is indicative of the incremental phase angle change of the master inverter.

Preferably, the common phase angle signal includes an absolute phase angle data format indicative of the absolute phase angle of the master inverter and an incremental phase angle data format indicative of an incremental phase angle change of the phase angle of the master inverter in a given time period. The absolute phase angle data format includes a flag set high and the incremental phase angle data format includes a flag set low. The absolute angle data format and the incremental phase angle data format are data bit formats having a fixed amount of data bits.

Further, in accordance with the object and other objects, the present invention provides an inverter system for carrying out the method of the present invention. The inverter system includes a master inverter having a voltage source. The voltage source of the master inverter provides a voltage having an associated phase angle which varies as a function of time in a phase cycle. The inverter system further includes a plurality of server inverters each having a voltage source. Each of the voltage sources of the server inverters provide a voltage having an associated phase angle which varies as a function of time in a phase cycle. The master inverter and the server inverters are connected in parallel.

The inverter system further includes a controller associated with the master inverter. The controller is operable for transmitting a common phase angle signal to each of the server inverters. The common phase angle signal is a function of the phase angle of the master inverter. The common phase angle signal is indicative of the absolute phase angle of the master inverter when the phase angle of the master inverter is equal to a phase angle value associated with a new phase cycle. The common phase angle signal is indicative of an incremental phase angle change of the phase angle of the master inverter in a given time period while the phase angle of the master inverter is different from the value associated with a new phase cycle.

BRIEF DESCRIPTION OF DRAWINGS

The present invention will now be described in further detail, and by way of example, with reference to the accompanying drawings, in which.

BEST MODE FOR CARRYING OUT THE INVENTION

Figure 1:
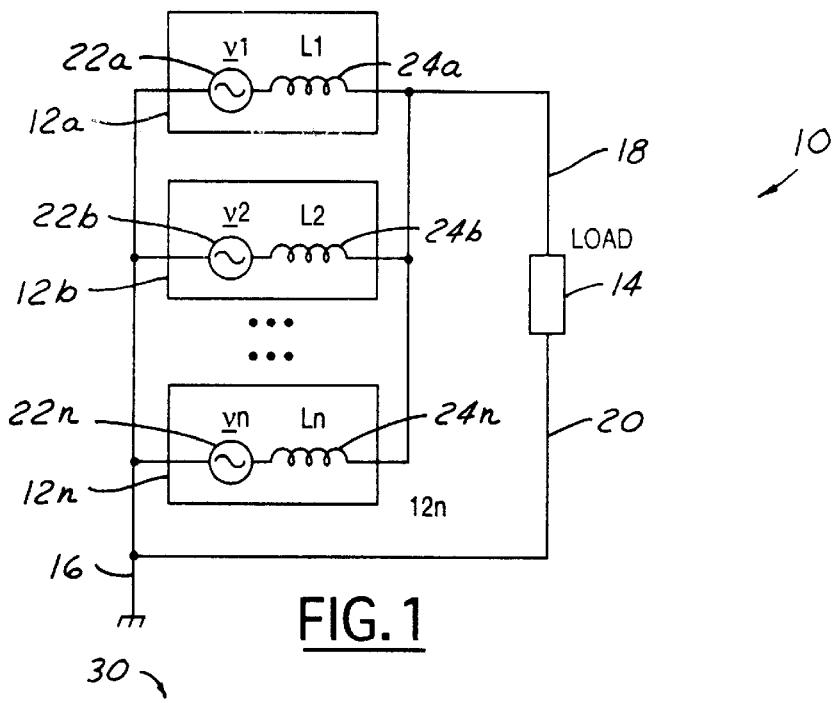
FIG. 1 illustrates a typical electric system having a plurality of parallel connected inverters providing voltage to a load.
Figure 2:
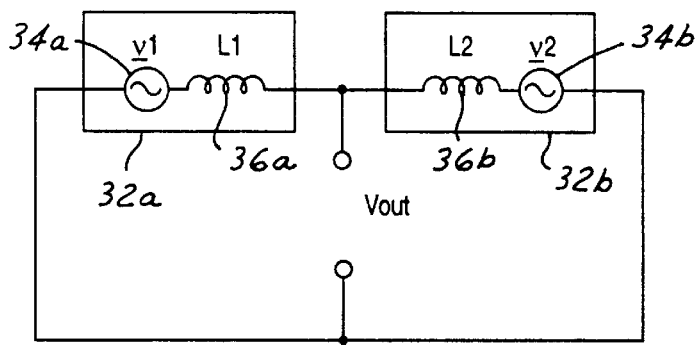
FIG. 2 illustrates a typical parallel connected inverter system having two inverters and no load.
Figure 3:
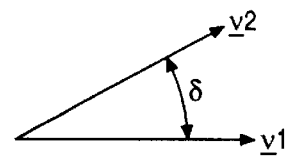
FIG. 3 illustrates the phase angle difference δ between the two voltage vectors $v_1$ and $v_2$ of the AC voltage sources of the respective inverters shown in FIG. 2.
Figure 4:
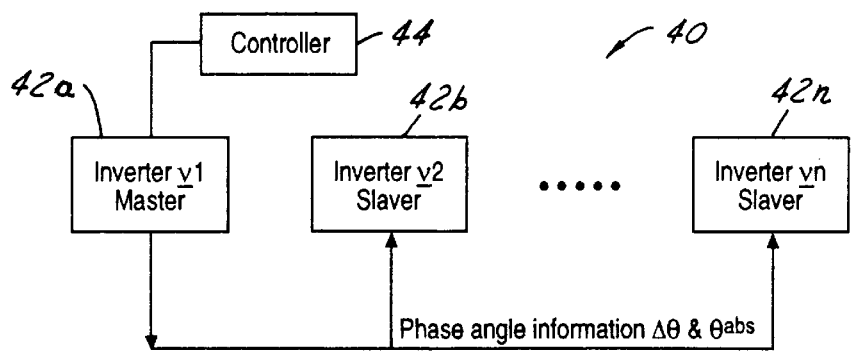
FIG. 4 illustrates a block diagram of a parallel connected inverter system in accordance with the present invention.

Referring now to FIG. 4, a block diagram of a parallel connected inverter system 40 in accordance with the present invention is shown. Inverter system 40 includes a master inverter 42a and a plurality of server inverters 42b and 42n. Inverter system 40 operates such that a common phase angle is used by all inverters 42 to eliminate and minimize any phase angle errors or differences among the inverters.

Master inverter 42a transmits a common phase angle signal to server inverters 42b and 42n to ensure that all of the inverters have a common phase angle. The common phase angle signal is a function of the phase angle of master inverter 42a. Server inverters 42b and 42n adjust their phase angles in accordance with the common phase angle signal such that their phase angles are equal to the phase angle of master inverter 42a. This ensures that all of the phase angles of inverters 42 are the same and have no differences. Master inverter 42a transmits the common phase angle signal in accordance with the method of the present invention.

Master inverter 42a transmits the phase angle information (i.e., the common phase angle signal) to server inverters 42b and 42n such that the accuracy of the transmission is guaranteed and the bus width requirement of the transmission is reduced. The common phase angle signal is encoded in a data bit format having a plurality of bits. Master inverter 42a uses two information transferring formats for the common phase angle signal: 1) an incremental phase angle Δθ format; and 2) an absolute phase angle $θ_{abs}$ format.

Referring now to FIGS. 5, 6, 7, and 8 with continual reference to FIG. 4, the incremental phase angle and the absolute phase angle signals will be described in greater detail.

Figure 5:
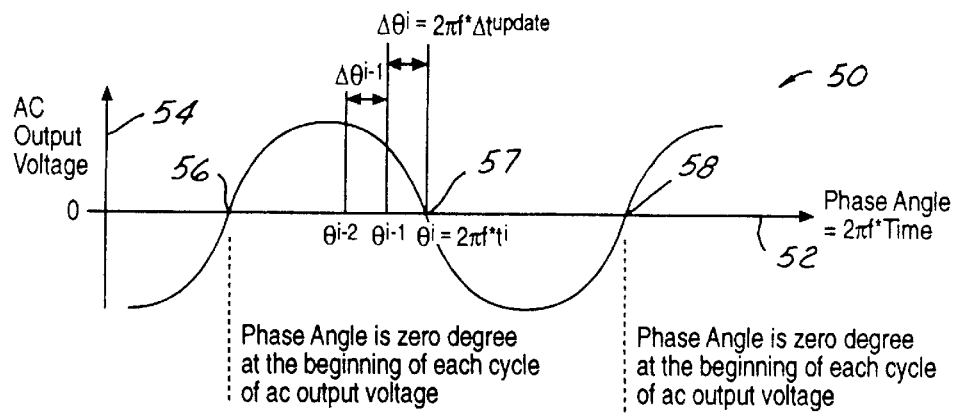
FIG. 5 illustrates a graph of the phase angle of the master inverter of the system of the present invention versus the AC output voltage of the master inverter.

FIG. 5 illustrates a graph 50 of the phase angle of master inverter 42a plotted along the x coordinate line 52 versus the AC output voltage of the master inverter plotted along the y coordinate line 54. The AC output voltage of master inverter 42a cycles periodically as a function of the phase angle. The AC output voltage is zero at points 56, 57, and 58. The AC output voltage is zero because the phase angle is 0° at point 56, 180° at point 57, and 360° (or 0°) at point 58. The AC output voltage varies in a cycle as the phase angle varies from 0° to 360°. After cycling through a cycle the AC output voltage starts the process over by cycling through a new cycle.

Figure 6:
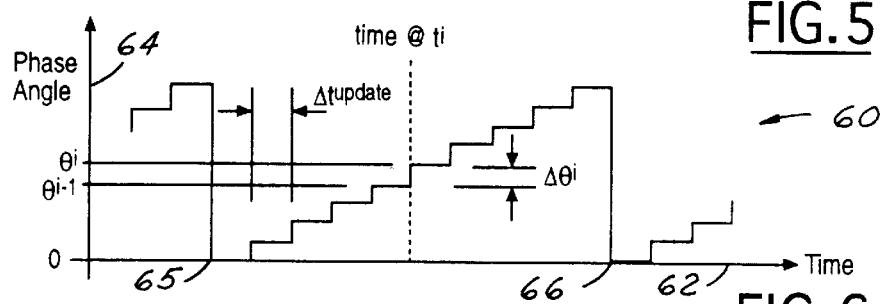
FIG. 6 illustrates a graph of time versus the phase angle increments of the master inverter of the system of the present invention.

FIG. 6 illustrates a graph 60 of time plotted along the x coordinate line 62 versus the phase angle of master inverter 42a plotted along the y coordinate line 64. At points 65 and 66 the phase angle of master inverter 42a is equal to 0°. From point 65 the phase angle increases from 0° until reaching 360° at point 66.

Master inverter 42a includes a controller 44 which updates the phase angle of the master inverter in a fixed period of time $Δt_{update}$. Controller 44 also updates the amount of the phase angle that the AC output voltage of master inverter 42a changes in the update time period $Δt_{update}$. The change in the phase angle is the incremental phase angle $Δθ_i$. The incremental phase angle $Δθ_i$ is determined in accordance with the following equation:

$$Δθ_i=θ_i-θ_{i-1}=2πf*Δt_{update}$$

where f is the fundamental operation frequency of inverters 42. Thus, as shown in FIG. 6, the incremental phase angle $Δθ_i$ is determined for each update time period $Δt_{update}$. The plot of graph 60 has step like plots of the phase angle of master inverter 42a because the update time periods are discrete values. As the update time period $Δt_{update}$ gets smaller the plot of the time versus phase angle in graph 60 becomes smoother and less step like.

The absolute phase angle $θ_i$ is the phase angle of the AC output voltage of master inverter 42a at the time $t_i$. The absolute phase angle $θ_i$ is also the accumulated value of the incremental phase angle $Δθ_i$ over time from 0°. The absolute phase angle $θ_i$ is 0° at the beginning of each cycle of the AC output voltage.

Controller 44 of master inverter 42a transmits a common phase angle signal to each of server inverters 42b and 42n for each update time period $Δt_{update}$. Controller 44 transmits a common phase angle signal indicative of the absolute phase angle $θ_i$ of master inverter 42a when the phase angle of the master inverter is equal to a phase angle value associated with a new phase cycle. This common phase angle signal is in the absolute phase angle format. Thus, each time the phase angle of master inverter 42a passes 0°, the common phase angle signal is indicative of $θ_0(0<θ_0<2πf*Δt_{update})$. In response to receiving this common phase angle signal, each server inverter 42b and 42n aligns its phase angle to $θ_0$. That is, $θ_i=θ_0$.

Controller 44 transmits a common phase angle signal indicative of an incremental phase angle change of the phase angle of master inverter 42a in a time update period while the phase angle of the master inverter is different from the phase angle value associated with a negative phase cycle.

This common phase angle signal is in the incremental angle change format. Thus, each time the phase angle of master inverter 42a is different from the phase angle value associated with a negative phase cycle, the common phase angle signal is indicative of the change of the phase angle of the master inverter in the time update period. In response to receiving this common phase angle signal, each server inverter 42b and 42n adjusts its phase angle to be equal to the summed value of 1) the incremental phase angle change of the phase angle of the master inverter in the time period and 2) the phase angle of the server inverter prior to the time period. That is, $\theta_i = \theta_{i-1} + \Delta\theta_i$.

Figure 7:
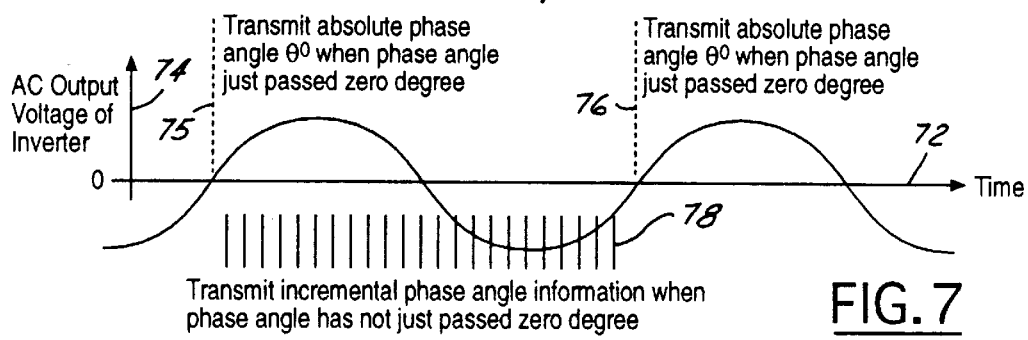
FIG. 7 illustrates a graph of time versus the AC output voltage of the master inverter of the system of the present invention.

FIG. 7 illustrates a graph 70 of the time plotted along the x coordinate line 72 versus the AC output voltage of master inverter 42a plotted along the y coordinate line 74. At time points 75 and 76 controller 44 transmits the common phase angle signal indicative of the absolute phase angle of master inverter 42a. During the time in between time points 75 and 76, generally indicated by 78, controller 42a transmits the common phase angle signal indicative of the incremental phase angle change of master inverter 42a.

Figure 8:
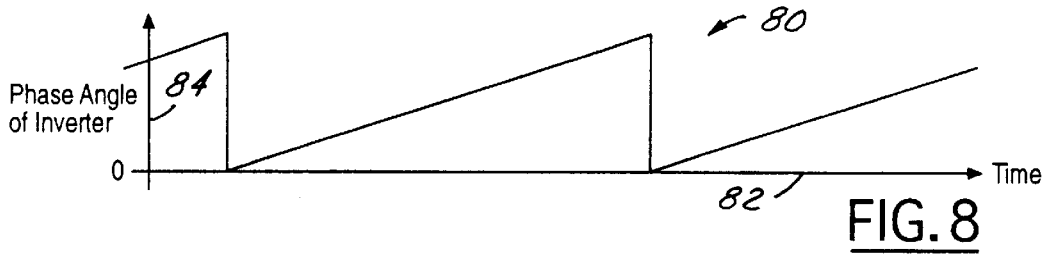
FIG. 8 illustrates a graph of time versus the phase angle of the master inverter of the system of the present invention.

FIG. 8 illustrates a graph 80 of the time plotted along the x coordinate line 82 versus the phase angle of master inverter 42a plotted along the y coordinate line 84. As shown, the phase angle of master inverter 42a cycles from 0° to 360° in periodic cycles.

Figure 9:
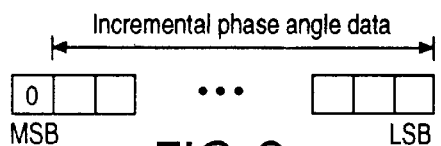
FIG. 9 illustrates an incremental phase angle data format for the common phase angle signal having the most significant bit set low.
Figure 10:
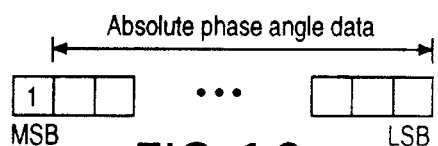
FIG. 10 illustrates an absolute phase angle data format for the common phase angle signal having the most significant bit set high.

Referring now to FIGS. 9 and 10, the incremental and absolute phase angle formats of the common phase angle signal will be described in greater detail. Each format is a data word having a given number of data bits, for instance, ten data bits. The most significant bit is a flag to indicate whether the common phase angle signal is indicative of the incremental or absolute phase angle format. For instance, the most significant bit is set low to indicate that the common phase angle signal is indicative of the incremental phase angle change format. Likewise, the most significant bit is set high to indicate that the common phase angle signal is indicative of the absolute phase angle format. The remaining bits of the data word are used for the numeric phase angle data.

The method and the system of the present invention have the following advantages: (1) data bus width for the information transferring is reduced to a smaller data range; (2) no accumulation error can occur because the phase angle is periodically aligned; (3) no truncation error occurs when the alignment is handled around phase angle=0°; and (4) the fundamental operation frequency can be dynamically changed. This yields a lower cost implementation with higher flexibility and reliability.

The following example describes the first advantage and demonstrates that the accuracy of the transmitting method is largely improved by transferring incremental phase angle information. Therefore, the data bus width for the information transferring is reduced for the same level of phase angle accuracy. Given a 10-bit data bus and 125 microsecond update time period, the phase angle resolution of different transferring formats is calculated and compared in the table as follows:

| Transmit Format | Data Range (degree) | Phase Angle Resolution $\Delta\phi$ (degree) | Note |
|---|---|---|---|
| Absolute Phase Angle | 0 to 360 | 0.35156 | $\Delta t = 125$ $\mu$-seconds for both cases |

-continued

| Transmit Format | Data Range (degree) | Phase Angle Resolution $\Delta\phi$ (degree) | Note |
|---|---|---|---|
| Incremental Phase Angle $\Delta\theta$ | 0 to 2.925 | 0.00286 | For system with maximum frequency 65 Hz, data range = $\Delta t$*65*360 |

The table shows that there is much better resolution to transmit incremental phase angle information than to transmit absolute phase angle information. There is much better resolution because the data range is greatly reduced. The table also implies that the transmitting method of the present invention requires much less data bus width than to only transmit absolute phase angle data for the same phase angle resolution.

With regards to the second advantage, alternating the transferring format to absolute phase angle is necessary to prevent accumulation error due to communication error. The method of the present invention proposes to perform the alignment only when the phase angle has just passed 0° which should have a small value, and therefore the accuracy can be improved.

Note that the absolute phase angle may not be 0° because the update time period of the phase angle may not be aligned with the beginning of the AC output voltage cycle. However, it must be within range of the incremental phase angle because the phase angle has just passed 0° and it only can increase so much per step.

Therefore, transferring absolute phase angle data when the phase angle has just passed 0° has the same resolution of transferring incremental phase angle data. In this way, the phase angle among the inverters can be periodically aligned to prevent accumulation error, and also the accuracy of the phase angles can be maintained.

Regarding the third advantage, because every inverter, including the master inverter and the server inverters, use the same information, there is no truncation error when the alignment is handled around phase angle equal to 0°.

With regard to the fourth advantage, the incremental phase angle $\Delta\theta$ is used by each server inverter to update its phase angle. At time $t_k$ the formula can be expressed as follows:

$$\theta_k = \theta_{k-1} + \Delta\theta_k$$

$$\Delta\theta_k = 2\pi * \Delta t * f_k$$

where $\theta_k$ is the new phase angle, $\theta_{k-1}$ is the phase angle before the update time period, $f_k$ is the fundamental operation frequency of the master inverter, and $\Delta t$ is the period of time that the phase angle is updated. Note that $f_k$ can be dynamically changed, and the information can be converted into $\Delta\theta_k$ to transfer from the master inverter to the server inverters.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A method for transmitting phase angle information between inverters in a parallel connected inverter system to synchronize the phase angles of the inverters, the inverter system having a master inverter and a plurality of server inverters connected in parallel, each inverter having a voltage source, each of the voltage sources generating a voltage having an associated phase angle which varies as a function of time in a phase cycle, the method comprising:

transmitting a common phase angle signal to each of the server inverters, the common phase angle signal being a function of the phase angle of the master inverter, wherein the common phase angle signal is indicative of the absolute phase angle of the master inverter when the phase angle of the master inverter is equal to a phase angle value associated with a new phase cycle, and the common phase angle signal is indicative of an incremental phase angle change of the phase angle of the master inverter in a given time period while the phase angle of the master inverter is different from the value associated with a new phase cycle.

2. The method of claim 1 further comprising:

controlling the phase angle of each of the server inverters in accordance with the common phase angle signal such that the phase angles of the master inverter and the server inverters are synchronized.

3. The method of claim 1 further comprising:

adjusting the phase angle of each of the server inverters to be equal to the absolute phase angle of the master inverter when the common phase angle signal is indicative of the absolute phase angle of the master inverter.

4. The method of claim 1 further comprising:

adjusting the phase angle of each of the server inverters to be equal to the summed value of 1) the incremental phase angle change of the phase angle of the master inverter in the given time period and 2) the phase angle of the respective server inverter prior to the given time period when the common phase angle signal is indicative of the incremental phase angle change of the master inverter.

5. The method of claim 1 wherein:

the common phase angle signal includes an absolute phase angle data format indicative of the absolute phase angle of the master inverter and an incremental phase angle data format indicative of an incremental phase angle change of the phase angle of the master inverter in a given time period, wherein the absolute phase angle data format includes a flag set high and the incremental phase angle data format includes a flag set low.

6. The method of claim 5 wherein:

the absolute angle data format and the incremental phase angle data format are data bit formats having a fixed amount of data bits.

7. An inverter system comprising:

a master inverter having a voltage source, the voltage source of the master inverter providing a voltage having an associated phase angle which varies as a function of time in a phase cycle;

a plurality of server inverters each having a voltage source, each of the voltage sources of the server inverters providing a voltage having an associated phase angle which varies as a function of time in a phase cycle, wherein the master inverter and the server inverters are connected in parallel; and a controller associated with the master inverter, the controller operable for transmitting a common phase angle signal to each of the server inverters, the common phase angle signal being a function of the phase angle of the master inverter, wherein the common phase angle signal is indicative of the absolute phase angle of the master inverter when the phase angle of the master inverter is equal to a phase angle value associated with a new phase cycle, and the common phase angle signal is indicative of an incremental phase angle change of the phase angle of the master inverter in a given time period while the phase angle of the master inverter is different from the value associated with a new phase cycle.

8. The system of claim 7 wherein:

the server inverters adjust their respective phase angles in accordance with the common phase angle signal such that the phase angles of the master inverter and the server inverters are synchronized.

9. The system of claim 7 wherein:

the server inverters adjust their phase angles to be equal to the absolute phase angle of the master inverter when the common phase angle signal is indicative of the absolute phase angle of the master inverter.

10. The system of claim 7 wherein:

the server inverters adjust their phase angles to be equal to the summed value of 1) the incremental phase angle change of the phase angle of the master inverter in the given time period and 2) the phase angle of the respective server inverter prior to the given time period when the common phase angle signal is indicative of the incremental phase angle change of the master inverter.

11. The system of claim 7 wherein:

the common phase angle signal includes an absolute phase angle data format indicative of the absolute phase angle of the master inverter and an incremental phase angle data format indicative of an incremental phase angle change of the phase angle of the master inverter in a given time period, wherein the absolute phase angle data format includes a flag set high and the incremental phase angle data format includes a flag set low.

12. The method of claim 11 wherein:

the absolute angle data format and the incremental phase angle data format are data bit formats having a fixed amount of data bits.

* * * * *